(12) United States Patent
Liu

(10) Patent No.: US 7,090,823 B1
(45) Date of Patent: Aug. 15, 2006

(54) METHOD FOR PREPARING A GEL CONTAINING NANOMETER TITANIUM DIOXIDE POWDERS FOR VISIBLE LIGHT PHOTOCATALYSIS

(75) Inventor: Wen-Chuan Liu, Taipei (TW)

(73) Assignee: ONID Technology Corp. (TW)

( * ) Notice: Subject to any disclaimer, the term of this patent is extended or adjusted under 35 U.S.C. 154(b) by 294 days.

(21) Appl. No.: 10/858,294

(22) Filed: Jun. 1, 2004

(51) Int. Cl.
*B01J 21/06* (2006.01)
*C01G 23/00* (2006.01)

(52) U.S. Cl. .................. 423/610; 423/69; 977/811; 502/350

(58) Field of Classification Search ............... 423/610, 423/69; 977/811; 502/350
See application file for complete search history.

(56) References Cited

U.S. PATENT DOCUMENTS

| | | | |
|---|---|---|---|
| 6,107,241 A * | 8/2000 | Ogata et al. | 502/350 |
| 6,429,169 B1 * | 8/2002 | Ichinose | 502/350 |
| 6,627,579 B1 * | 9/2003 | Sakatani et al. | 502/350 |
| 6,919,029 B1 * | 7/2005 | Meng et al. | 210/665 |
| 2005/0013766 A1 * | 1/2005 | Imura et al. | 423/610 |
| 2006/0034752 A1 * | 2/2006 | Lin et al. | 423/610 |

* cited by examiner

*Primary Examiner*—Stanley S. Silverman
*Assistant Examiner*—Timothy C. Vanoy
(74) *Attorney, Agent, or Firm*—Jackson Walker, LLP

(57) ABSTRACT

A method for preparing a gel containing nanometer titanium dioxide particles for visible light photocatalysis, the method has the following acts of: obtaining titanium hydroxide; inverting titanium hydroxide into titanium dioxide by adding an oxidant, an improving agent, an optional acid, and an optional surfactant to compose a solution; and aging the solution by heating to make the solution become a gel. The gel made by the present invention has photocatalystic characteristic and self-cleaning efficiency particularly in visible light but not in ultraviolet light as conventional gel.

19 Claims, No Drawings

METHOD FOR PREPARING A GEL CONTAINING NANOMETER TITANIUM DIOXIDE POWDERS FOR VISIBLE LIGHT PHOTOCATALYSIS

BACKGROUND OF THE INVENTION

1. Field of the Invention

The present invention relates to a method for preparing a gel containing nanometer titanium dioxide powders, and more particularly to a gel containing nanometer titanium dioxide powder in sizes ranging from 2 to 50 nm and having photocatalystic characteristic and self-cleaning efficiency in visible light.

2. Description of Related Art

Since 1970, most studies of titanium dioxide for manufacturing semiconductor have been subjected to photochemical reactions and semiconducting reactions on the present titanium dioxide particles. In these studies, crystalline configuration and grain sizes certainly affect the photochemical and semiconducting reactions. Preferably, anatase or anatase/rutile in the size of 30 nm is the optimal material. However, no study refers to the preparation and actual application to the titanium dioxide. Since 1990, titanium dioxide has been found to have great application in environmental cleaning and has actually been used since 1997. However, the studies still focus on the application but not the preparation of the titanium dioxide.

Conventional preparations of the titanium dioxide particles are divided into two types and are illustrated as follows:

1. Grinding pulverization: the titanium dioxide particles made by grinding are uneven in particle sizes as of 10 to 500 nm and have non-united crystalline configurations. Therefore, the titanium dioxide particles do not have photocatalytic characteristic and self-cleaning efficiency and are only applied in paints, cosmetics or correction fluids. Although the grinding method is improved by applying ultrasonic technology or adding acid solutions for chemical grinding to make the titanium dioxide particles even, the crystalline configuration of the titanium dioxide particles does not improve much.

2. Chemical synthesis: the chemical synthesis comprises three methods such as chemical vapor deposition (CVD) synthesis, organic solvent synthesis, and aqua synthesis. The chemical vapor deposition (CVD) method generates stable and highly pure titanium dioxide but is expensive in manufacturing. The organic solvent synthesis is to use titanium oxyalkyl ($Ti(OR)_4$) to synthesize titanium dioxide particles, wherein the titanium oxyalkyl is sopped into an organic solvent such as glycol and heated to obtain titanium dioxide. However, the titanium oxyalkyl is expensive and operation must be carried out at a high temperature and a high pressure. Thus, the manufacturing cost of the organic solvent synthesis is not economic for manufacturers.

With regard to the aqua synthesis, titanium chloride ($TiCl_4$) solution is mixed with a binding agent or an acid solution to heat to generate a gel containing titanium dioxide. However, chlorine ions are also generated which make the gel unstable and easily decomposed. Additionally, titanium dioxide made by the chemical synthesis is only efficient in ultraviolet light so that application of the gel containing titanium dioxide is limited.

According to the above description, the titanium dioxide is only used with ultraviolet light and that limits the application of the titanium dioxide. Therefore, the present invention has arisen to provide a method for preparing a gel containing nanometer titanium dioxide particles for visible light to improve the usage of the titanium dioxide.

SUMMARY OF THE INVENTION

The main objective of the present invention is to provide a method for preparing a gel containing nanometer titanium dioxide, wherein the gel has photochemical and self-cleaning efficiency and is effective in visible light.

Further benefits and advantages of the present invention will become apparent after a careful reading of the detailed description.

DETAILED DESCRIPTION OF THE PREFERRED EMBODIMENT

A method for preparing a gel containing nanometer titanium dioxide particles, wherein the gel made by this method has photocatalystic efficiency in visible light. The method in the present invention uses titanium hydroxide to manufacture titanium dioxide particles and particularly comprises the steps of an inverting process and an aging process to titanium hydroxide.

In the inverting process, clean (washed) titanium hydroxide ($Ti(OH)_2$, $Ti(OH)_4$) is added into deionized water and mixed with an oxidant, an acid or both to compose a solution to transform titanium hydroxide into titanium dioxide, wherein the acid is selectively an organic acid or an inorganic acid. Then, at least one additive, at least one improving agent, and optionally at least one surfactant are mixed with the solution. The oxidant is selected from the group comprising perchloric acid, periodic acid, potassium permanganate, sodium permanganate, nitric acid etc., and has a quantity of 1 to 200 g/L. The inorganic acid is selected from the group comprising hydriodic acid, hydrobromic acid, hydrochloric acid, sulfuric acid, nitric acid, phosphoric acid, periodic acid etc., and has a quantity of 0.1 to 120 ml/L. The organic acid is selected from the group comprising formic acid, acetic acid, oxalic acid, picric acid, citric acid, tartaric acid etc., and has a quantity of 0.1 to 100 ml/L. The oxidant and the acid can be alternatively or both added into the titanium hydroxide solution, which depends on the usage of the gel. If the gel is used for spraying, the oxidant is preferably added into the titanium hydroxide solution. If the gel is used for laminating or is highly concentrated, the acid or both the acid and the oxidant are preferably added to the titanium hydroxide solution. Determining the species of the acid is dependent on substrate, on which the gel is applied.

The improving agent has a quantity of 0.05 to 75 nm/L and is selected from the group comprising silicate, poly-aluminum chloride (PAC), aluminum oxide, aluminum sulfate, silane etc. By applying the improving agent, the titanium dioxide particles are modified to have more micro-rough surface to increase adhesive and less surface electric charges to reduce repulsion force. The optional surfactant has molecular weight of 200 to 1000 and a quantity of 10 to 5000 ppm and is selected from the group comprising polyethylene glycol (PEG), polypropylene glycol (PPG), nonylphenol (NP), natural alcohol etc.

Determining the improving agent is dependent on the material of the substrate. When the substrate is made of natural material such as wood, paper, or fabric, the improving agent is preferably silicate, poly-aluminum chloride, aluminum oxide, and aluminum sulfate. When the substrate is made of inorganic material such as glass, metal, stone, or ceramics, the improving agent is preferably silicate. When the substrate is made of artificial fiber and macromolecule polymers, the improving agent is preferably silicate and silane.

The additive is selected from the group comprising oxide, hydroxide, nitrate, carbonate, phosphate, sulfate and chloride, all containing metal compounds of iron, copper, zinc, nickel, vanadium, tin, gold, silver, platinum or palladium. A quantity of the additive is 1 mg/L to 5 g/L.

When the titanium hydroxide is inverted by adding the oxidant or further the acid and the optional improving agent to compose the solution, the temperature of the inverting process is kept at 10 to 95° C. dependent on species of the additive, for at least 10 min. The stirring rate of the mixture is at 30 to 300 rpm.

After inverting, the temperature of the mixture is increased to 50 to 95° C. and stirred at 30 to 300 rpm for 4 to 72 hours to age the mixture. After aging, the mixture becomes gel and is then filtered to separate the gel and residual solution to obtain the gel only. Thereby, the gel containing nanometer titanium dioxide particles is obtained.

To operationally verify the preparation of the gel containing nanometer titanium dioxide particles in accordance with the present invention, three examples are illustrated as follows:

EXAMPLE 1

In a 20 L reacting tank, 10 L of deionized water was added into the reacting tank and stirred at 300 rpm to mix with 500 g of titanium tetrachloride ($TiCl_4$), wherein titanium tetrachloride was added into the reacting tank at 4 mg/min by a quantitative pump and temperature of the reacting tank was kept at 5 to 10° C. After adding all titanium tetrachloride into the reacting tank, the solution of the titanium tetrachloride was still stirred for 2 hours until the solution became clear. Then, 20% of ammonia was injected into the solution at 10 ml/min to increase the pH value of the solution and the stirring rate was increased to 600 rpm. When the pH value of the solution was increased to 4.0, the injecting rate of the ammonia was adjusted to 2 to 4 ml/min. The injection of the ammonia was stopped when the pH value reached 7.5 to 8.0. Wherein, the titanium tetrachloride mixed with ammonia was transformed into titanium(IV) hydroxide ($Ti(OH)_4$) to deposit in the solution. After filtering the solution, titanium (IV) hydroxide in the form of white solid was obtained. The solid of titanium(IV) hydroxide was washed in a 200 L washing tank containing 100 L of soft water or piped water and stirred at 600 rpm for 2 hours until the solid of titanium(IV) hydroxide was evenly distributed in the washing tank. Preferably, the solid of titanium(IV) hydroxide was washed three times and then filtered to separate from the water. The filtered titanium hydroxide solid was transported into an inverting and aging tank. 20 L of deionized water was previously poured into the inverting and aging tank, and the titanium hydroxide solid with the water was stirred at 300 rpm for 1 hour to make the titanium hydroxide solid evenly distributed. 50 ml of perchloric acid was added into the inverting and aging tank and stirred for 30 min at room temperature. Then, 80 ml of 25% (W/W) silicate and 1 g of silver carbonate were added into the inverting and aging tank and stirred for 30 min at 300 rpm. Lastly, the temperature of the inverting and aging tank was increased to 80 to 90° C. to be continuously stirred for 6 hours and then cooled, whereafter the pH value was adjusted to 4 to 9 to obtain the gel containing nanometer titanium dioxide particles.

The gel made by this method is translucent with a pale gold color, and has pH value of 4 to 9. Titanium dioxide is about 1% (V/V) and in the form of 5 to 15 nm particles sizes. The crystalline configuration of the titanium dioxide is needle or sheet crystallization. The gel obtained from the present invention can be sprayed on surfaces of the substrate and has self-cleaning, photocatalytic and bactericidal efficiency when illuminated by visible light.

EXAMPLE 2

Example 2 has the same operational procedure as that of example 1 except for using 200 ml of hydrogen peroxide to replace the perchloric acid, using 100 ml of 10% (V/V) poly-aluminum chloride to replace the silicate, using 3 g of silver carbonate to replace the stannous chloride ($SnCl_2.H_2O$). The operational conditions in the example are the same as those in example 1. The gel obtained in example 2 is transparent, colorless or yellow in color and has a pH value of 7 to 9. Titanium dioxide is about 1% (V/V) and in the form of 5 to 20 nm particles sizes. The crystalline configuration of the titanium dioxide is needle or sheet crystallization. The gel obtained from the present invention can be sprayed on surfaces of the substrate and has self-cleaning efficiency, photocatalytic characteristic, and bactericidal efficiency when illuminated by visible light.

EXAMPLE 3

Example 3 has the same operational procedure as that of example 1 except for using 10 ml of silane to replace the silicate. The operational conditions in this example are the same as those in example 1. The gel obtained in example 3 is transparent, yellow in color and has a pH value of 7 to 9. Titanium dioxide is about 1% (V/V) and in the form of 5 to 30 nm particles sizes. The crystalline configuration of the titanium dioxide is needle or sheet crystallization. The gel obtained from the present invention can be sprayed on surfaces of the artificial fibers or macromolecule polymers and has self-cleaning efficiency and photocatalytic characteristic when illuminated by visible light.

Although the invention has been explained in relation to multiple preferred embodiments in these examples, many other possible modifications and variations can be made without departing from the spirit and scope of the invention as hereinafter claimed.

What is claimed is:

1. A method for preparing a gel containing nanometer titaninum dioxide particles for visible light photocatalysis, the method comprising acts of:
   obtaining titanium hydroxide;
   inverting the titanium hydroxide to titanium dioxide, wherein titanium hydroxide is mixed with deionized water, an oxidant, an additive, and an improving agent to compose a solution and to invert titanium hydroxide into titanium dioxide particles in the solution; and
   aging the solution to become gel containing the titanium dioxide particles, wherein the solution is aged by heating.

2. The method as claimed in claim 1, wherein the inverting act further has an acid added into the solution.

3. The method as claimed in claim 2, wherein the acid is an inorganic acid selected from the group consisting of hydriodic acid, hydrobromic acid, hydrochloric acid, sulfuric acid, nitric acid, phosphoric acid, and periodic acid.

4. The method as claimed in claim 3, wherein a quantity of the inorganic acid is 0.1 to 120 ml/L.

5. The method as claimed in claim 2, wherein the acid is an organic acid selected from the group consisting of formic acid, acetic acid, oxalic acid, picric acid, citric acid, and tartaric acid.

6. The method as claimed in claim 5, wherein a quantity of the organic acid is 0.1 to 100 ml/L.

7. The method as claimed in claim 1, wherein the inverting act further has a surfactant added into the solution.

8. The method as claimed in claim 7, wherein the surfactant is selected from the group consisting of polyethylene glycol (PEG), polypropylene glycol (PPG), nonyl-phenol (NP) and natural alcohol.

9. The method as claimed in claim 8, wherein the surfactant has a molecular weight of 200 to 1000 and a quantity of 10 to 5000 ppm.

10. The method as claimed in claim 1, wherein the oxidant in the inverting act is selected from the group consisting of perchloric acid, periodic acid, potassium permanganate, sodium permanganate and nitric acid.

11. The method as claimed in claim 10, wherein quantity of the oxidant is 1 to 200 g/L.

12. The method as claimed in claim 1, wherein the improving agent in the inverting act is selected from the group consisting of silicate, poly-aluminum chloride (PAC), aluminum oxide, aluminum sulfate, and silane.

13. The method as claimed in claim 12, wherein a quantity of the improving agent is 0.05 to 75 nm/L.

14. The method as claimed in claim 1, wherein the additive is selected from the group consisting of oxide, hydroxide, nitrate, carbonate, phosphate, sulfate and chloride, all containing at least one metal selected from the group consisting of iron, copper, zinc, nickel, vanadium, tin, gold, silver, platinum or palladium.

15. The method as claimed in claim 14, wherein a quantity of the additive is 1 mg/L to 5 g/L.

16. The method as claimed in claim 1, wherein the inverting act is carried out at a temperature of 10 to 95° C.

17. The method as claimed in claim 16, wherein the solution is stirred at 30 to 300 rpm in the inverting act.

18. The method as claimed in claim 1, wherein the aging act is carried out at a temperature of 50 to 95° C.

19. The method as claimed in claim 18, wherein the aging act is carried out for 4 to 72 hours.

* * * * *